United States Patent
Kasztenny

(10) Patent No.: US 11,735,907 B2
(45) Date of Patent: Aug. 22, 2023

(54) TRAVELING WAVE OVERCURRENT PROTECTION FOR ELECTRIC POWER DELIVERY SYSTEMS

(71) Applicant: Schweitzer Engineering Laboratories, Inc., Pullman, WA (US)

(72) Inventor: Bogdan Z. Kasztenny, Markham (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 114 days.

(21) Appl. No.: 17/647,252

(22) Filed: Jan. 6, 2022

(65) Prior Publication Data

US 2022/0247166 A1 Aug. 4, 2022

Related U.S. Application Data

(60) Provisional application No. 63/145,034, filed on Feb. 3, 2021.

(51) Int. Cl.
*H02H 7/22* (2006.01)
*H02H 1/00* (2006.01)

(52) U.S. Cl.
CPC .......... *H02H 7/22* (2013.01); *H02H 1/0007* (2013.01)

(58) Field of Classification Search
CPC ........ H02H 1/0007; H02H 3/042; H02H 3/28; H02H 3/305; H02H 7/22; H02H 7/261; H02H 7/263; H02H 7/265; H04B 3/46
See application file for complete search history.

(56) References Cited

U.S. PATENT DOCUMENTS

| | | |
|---|---|---|
| 3,585,298 A | 6/1971 | Liberman |
| 3,670,240 A | 6/1972 | Maranchak |
| 3,878,460 A | 4/1975 | Nimmersjö |
| 3,890,544 A | 6/1975 | Chamia |
| 3,956,671 A | 5/1976 | Nimmersjö |
| 4,053,816 A | 10/1977 | Nimmersjö |
| 4,063,162 A | 12/1977 | Lanz |
| 4,063,164 A | 12/1977 | Lanz |
| 4,063,165 A | 12/1977 | Lanz |

(Continued)

OTHER PUBLICATIONS

Kasztenny and Mynam "Traveling-Wave Overcurrent—A New Way to Protect Lines Terminated on Transformers", 2021, 48th Annual Western Protective Relay Conference. Retrieved from Internet:<https://selinc.com/api/download/135473/> (Year: 2021).*

(Continued)

*Primary Examiner* — Jared Fureman
*Assistant Examiner* — Nicolas Bellido
(74) *Attorney, Agent, or Firm* — Richard M. Edge

(57) ABSTRACT

Protection of an electric power delivery system using a traveling wave overcurrent element is disclosed herein. A maximum traveling wave mode among the alpha and beta modes is selected and compared with a traveling wave overcurrent threshold to determine a traveling wave overcurrent. Traveling wave overcurrent protection may be enabled depending on a termination status of the protected electric power delivery system. When a remote terminal is terminated on high surge impedance, a local protection system may use local traveling wave current quantities to determine a traveling wave overcurrent, and the traveling wave overcurrent may be used for line protection. Systems for detecting a termination status use local and remote current quantities.

22 Claims, 9 Drawing Sheets

(56) References Cited

U.S. PATENT DOCUMENTS

| | | |
|---|---|---|
| 4,165,482 A | 8/1979 | Gale |
| 4,183,072 A | 1/1980 | Takagi |
| 4,251,770 A | 2/1981 | Schweitzer, Jr. |
| 4,254,444 A | 3/1981 | Eriksson |
| 4,296,452 A | 10/1981 | Eriksson |
| 4,342,064 A | 7/1982 | Wilkinson |
| 4,344,142 A | 8/1982 | Diehr |
| 4,351,011 A | 9/1982 | Liberman |
| 4,352,137 A | 9/1982 | Johns |
| 4,371,907 A | 2/1983 | Bignell |
| 4,377,834 A | 3/1983 | Eriksson |
| 4,438,475 A | 3/1984 | Haley |
| 4,475,079 A | 10/1984 | Gale |
| 4,499,417 A | 2/1985 | Wright |
| 4,500,834 A | 2/1985 | Ko |
| 4,618,933 A | 10/1986 | Vitins |
| 4,626,772 A | 12/1986 | Michel |
| 4,766,549 A | 8/1988 | Schweitzer |
| 4,797,805 A | 1/1989 | Nimmersjö |
| 4,800,509 A | 1/1989 | Nimmersjö |
| 4,825,326 A | 4/1989 | Andow |
| 5,083,086 A | 1/1992 | Steiner |
| 5,140,492 A | 8/1992 | Schweitzer, III |
| 5,198,746 A | 3/1993 | Gyugyi |
| 5,367,426 A | 11/1994 | Schweitzer, III |
| 5,446,387 A | 8/1995 | Eriksson |
| 5,481,195 A | 1/1996 | Meyer |
| 5,515,227 A | 5/1996 | Roberts |
| 5,572,138 A | 11/1996 | Nimmersjö |
| 5,682,100 A | 10/1997 | Rossi |
| 5,729,144 A | 3/1998 | Cummins |
| 5,796,258 A | 8/1998 | Yang |
| 6,222,711 B1 | 4/2001 | Hori |
| 6,239,959 B1 | 5/2001 | Alexander |
| 6,341,055 B1 | 1/2002 | Guzman-Casillas |
| 6,417,791 B1 | 7/2002 | Benmouyal |
| 6,434,715 B1 | 8/2002 | Andersen |
| 6,477,475 B1 | 11/2002 | Takaoka |
| 6,525,543 B1 | 2/2003 | Roberts |
| 6,597,180 B1 | 7/2003 | Takaoka |
| 6,601,001 B1 | 7/2003 | Moore |
| 6,662,124 B2 | 12/2003 | Schweitzer, III |
| 6,798,211 B1 | 9/2004 | Rockwell |
| 6,845,333 B2 | 1/2005 | Anderson |
| 6,944,554 B2 | 9/2005 | Kim |
| 7,119,546 B2 | 10/2006 | Cautereels |
| 7,174,261 B2 | 2/2007 | Gunn |
| 7,345,862 B2 | 3/2008 | Schweitzer, III |
| 7,535,233 B2 | 5/2009 | Kojovic |
| 7,714,735 B2 | 5/2010 | Rockwell |
| 7,733,094 B2 | 6/2010 | Bright |
| 8,315,827 B2 | 11/2012 | Faybisovich |
| 8,410,785 B2 | 4/2013 | Calero |
| 8,502,542 B2 | 8/2013 | Couture |
| 8,525,522 B2 | 9/2013 | Gong |
| 8,598,887 B2 | 12/2013 | Bjorklund |
| 8,655,609 B2 * | 2/2014 | Schweitzer, III .... G01R 31/085 702/57 |
| 8,675,327 B2 | 3/2014 | Kasztenny |
| 8,781,766 B2 | 7/2014 | Schweitzer |
| 8,990,036 B1 | 3/2015 | Schweitzer |
| 9,257,827 B2 | 2/2016 | Calero |
| 9,316,671 B2 | 4/2016 | Johannesson |
| 9,470,748 B2 | 10/2016 | Schweitzer |
| 9,594,112 B2 | 3/2017 | Schweitzer |
| 9,627,881 B2 | 4/2017 | Schweitzer |
| 9,755,673 B2 | 9/2017 | Hellmann |
| 9,941,684 B2 | 4/2018 | Calero |
| 10,090,664 B2 | 10/2018 | Schweitzer |
| 10,310,004 B2 | 6/2019 | Schweitzer |
| 10,310,005 B2 | 6/2019 | Schweitzer |
| 10,483,747 B2 * | 11/2019 | Schweitzer, III .... G01R 31/085 |
| 10,677,834 B2 | 6/2020 | Kasztenny |
| 11,307,264 B2 * | 4/2022 | Guzman-Casillas ....... G01R 31/085 |

| | | |
|---|---|---|
| 2001/0012984 A1 | 8/2001 | Adamiak |
| 2002/0165462 A1 | 11/2002 | Westbrook |
| 2003/0099070 A1 | 5/2003 | Macbeth |
| 2004/0189317 A1 | 9/2004 | Borchert |
| 2004/0230367 A1 | 11/2004 | Miller |
| 2004/0230387 A1 | 11/2004 | Bechhoefer |
| 2005/0151659 A1 | 7/2005 | Donovan |
| 2006/0012374 A1 | 1/2006 | Kojovic |
| 2006/0198065 A1 | 9/2006 | Guzman-Casillas |
| 2006/0239602 A1 | 10/2006 | Li |
| 2007/0041137 A1 | 2/2007 | Thompson |
| 2007/0086134 A1 | 4/2007 | Zweigle |
| 2007/0103006 A1 | 5/2007 | Zushi |
| 2008/0077336 A1 | 3/2008 | Fernandes |
| 2008/0143344 A1 | 6/2008 | Focia |
| 2008/0239602 A1 | 10/2008 | Kasztenny |
| 2009/0230974 A1 | 9/2009 | Kojovic |
| 2009/0231769 A1 | 9/2009 | Fischer |
| 2010/0002348 A1 | 1/2010 | Donolo |
| 2011/0058285 A1 | 3/2011 | Wibben |
| 2011/0063761 A1 | 3/2011 | Kasztenny |
| 2011/0068803 A1 | 3/2011 | Calero |
| 2011/0173496 A1 | 7/2011 | Hosek |
| 2011/0264388 A1 | 10/2011 | Gong |
| 2012/0086459 A1 | 4/2012 | Kim |
| 2012/0182657 A1 | 7/2012 | Narendra |
| 2013/0021039 A1 | 1/2013 | Bjorklund |
| 2013/0096854 A1 | 4/2013 | Schweitzer |
| 2013/0100564 A1 | 4/2013 | Zhang |
| 2013/0241622 A1 | 9/2013 | Zerbe |
| 2014/0074414 A1 | 3/2014 | Schweitzer, III |
| 2014/0236502 A1 | 8/2014 | Calero |
| 2015/0233976 A1 | 8/2015 | Johannesson |
| 2015/0255978 A1 | 9/2015 | Chen |
| 2016/0077149 A1 | 3/2016 | Schweitzer |
| 2016/0077150 A1 | 3/2016 | Schweitzer |
| 2016/0084893 A1 | 3/2016 | Schweitzer |
| 2016/0187406 A1 | 6/2016 | Liu |
| 2016/0266192 A1 | 9/2016 | Burek |
| 2017/0012424 A1 | 1/2017 | Schweitzer |
| 2017/0082675 A1 | 3/2017 | Schweitzer |
| 2017/0089971 A1 | 3/2017 | Xu |
| 2017/0104324 A1 | 4/2017 | Schweitzer |
| 2017/0117701 A1 | 4/2017 | Johannesson |
| 2017/0146613 A1 | 5/2017 | Schweitzer |
| 2017/0307676 A1 | 10/2017 | Gaouda |
| 2017/0356965 A1 | 12/2017 | Guzman-Casillas |
| 2018/0034265 A1 | 2/2018 | Naidu |
| 2018/0083437 A1 | 3/2018 | Schweitzer, III |
| 2018/0106849 A1 | 4/2018 | Burek |
| 2018/0136269 A1 | 5/2018 | Schweitzer, III |
| 2018/0145505 A1 | 5/2018 | Li |
| 2018/0212421 A1 | 7/2018 | Schweitzer, III |
| 2018/0292448 A1 | 10/2018 | Schweitzer |
| 2018/0301894 A1 | 10/2018 | Ha |
| 2020/0088780 A1 | 3/2020 | Kasztenny |

OTHER PUBLICATIONS

Edmund O. Schweitzer III, Armando Guzman, Mangapathirao V. Mynam, Veselin Skendzic, Bogdan Kasztenny, Stephen Marx, "Locating Faults by the Traveling Waves they Launch" IEEE, Feb. 2014.

Edmund O. Schweitzer III, Bogdan Kasztenny, Armando Guzman, Veselin Skendzic, Mangapathirao V. Mynam, "Speed of Line Protection—Can We Break Free of Phasor Limitations?" Originally presented at the 41st Annual Western Protective Relay Conference, Oct. 2014.

Bogdan Kasztenny, Armando Guzman, Normann Fischer, Mangapathirao V. Mynam, Douglas Taylor "Practical Setting Considerations for Protective Relays That Use Incremental Quantities and Traveling Naves" Originally presented at the 43rd Annual Western Protective Relay Conference, Oct. 2016.

European Patent Application No. 22154372.1, European Search Report, dated Jun. 23, 2022.

* cited by examiner

TRAVELING WAVE OVERCURRENT PROTECTION FOR ELECTRIC POWER DELIVERY SYSTEMS

RELATED APPLICATION

This application claims priority from and benefit of U.S. Provisional Application Ser. No. 63/145,034 filed on 3 Feb. 2021 entitled "Traveling Wave Overcurrent Protection for Electric Power Delivery Systems" which is hereby incorporated by reference in its entirety for all purposes.

TECHNICAL FIELD

This disclosure relates to traveling wave overcurrent protection of electric power delivery systems. More particularly, this disclosure relates to traveling wave overcurrent protection when power system conditions disfavor traveling wave differential protection.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
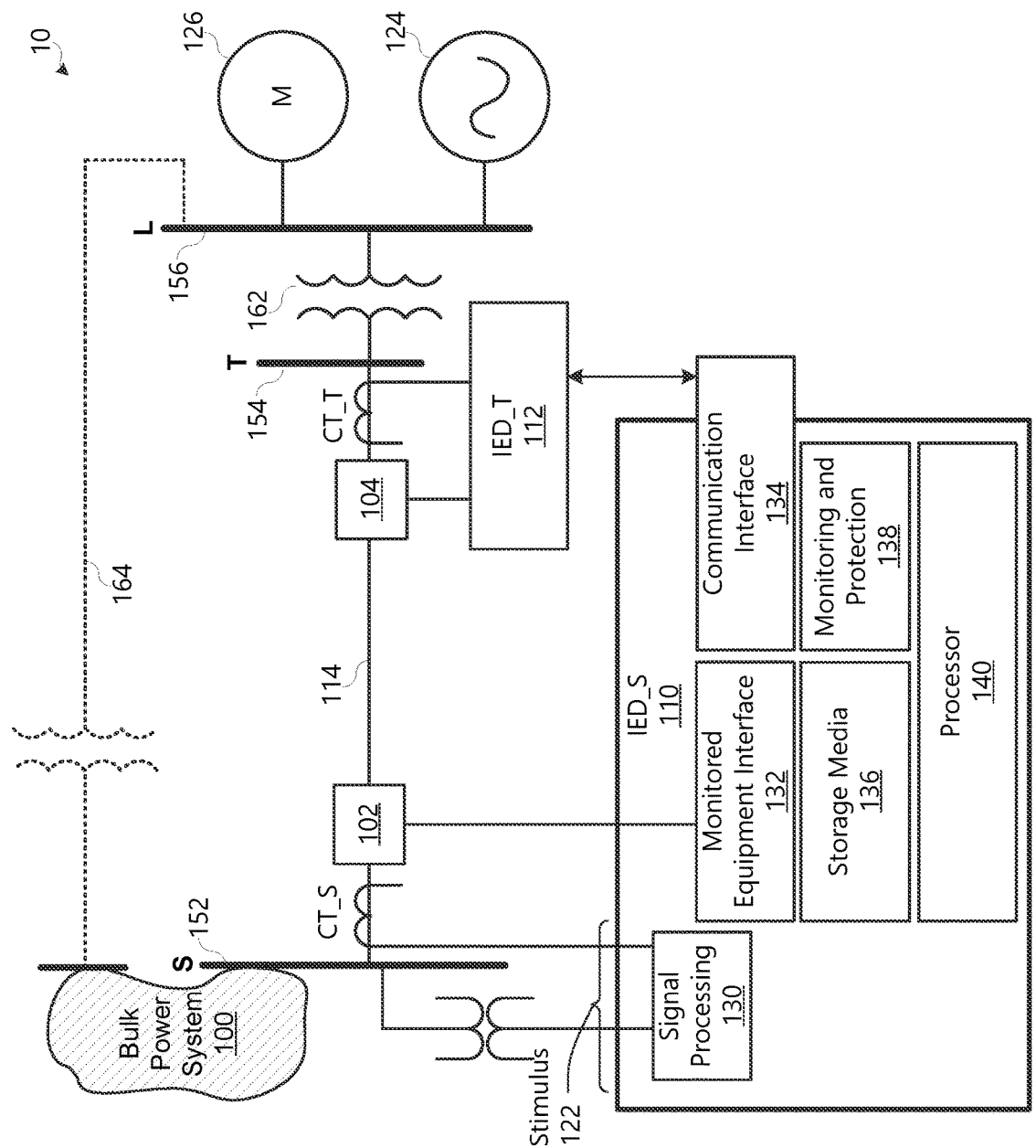
FIG. 1 illustrates a one-line diagram of an electrical power delivery system comprising Intelligent Electronic Devices (IEDs) implementing protection in accordance with several embodiments herein.

Electric power delivery systems are typically monitored and protected by IEDs that obtain electrical measurements such as voltage and current from the power system. IEDs use those measurements to determine a condition of the power system, and effect a protective action (such as signaling a circuit breaker to trip) under certain determined conditions. Recently, IEDs have been developed to use traveling wave principles for locating faults and provide protection. Indeed, time-domain line protection elements that are now being used include traveling wave directional elements (e.g. TW32), traveling wave differential elements (e.g. TW87), incremental-quantity directional elements (e.g. TD32), and incremental-quantity distance elements (e.g. TD21).

These elements may be implemented to detect fault conditions and effect protective actions. For example, incremental-quantity distance elements may be configured to trip directly (e.g. when an underreaching incremental-quantity distance element of an IED detects a fault, that IED may send a trip signal to an associated circuit breaker); and the traveling wave directional elements and incremental-quantity directional elements may be used in permissive overreaching transfer trip (POTT) schemes over a protection channel. Traveling wave differential elements may be use in a differential scheme when an appropriate communication channel (e.g. direct fiber optic) is available between IEDs at the different locations on the power system.

These time-domain elements and schemes have been designed to use instrument transformers and control cables that are presently available on electric power delivery systems to obtain electric power delivery system secondary signals from primary equipment. The quality of the available instrument transformers and control cables—in terms of how well they reproduce primary signals—may impact traveling wave based protection dependability. Current transformers (CTs) and their control cables reproduce traveling wave components in the current signals with sufficient fidelity. Voltage transformers (VTs) and their control cables introduce significant interfering signals, typically in the form of ringing. VTs, and even capacitively coupled voltage transformers (CCVTs) can reproduce the polarity and timing of the very first traveling wave in the voltage signal, but ringing and attenuation makes it difficult to identify subsequent traveling waves.

Because VTs do not reproduce traveling waves well, a practical traveling wave based protection cannot separate incident and reflected traveling waves, and must operate on the total current traveling waves. As is shown in more detail in FIG. 3, a total current traveling wave is the traveling wave component directly measured from the CT secondary current and is a sum of the incident 306 and reflected 308 current traveling waves. This limitation of measuring the total current only without the option to separate it into incident and reflected traveling waves, creates an obstacle when applying traveling wave based protection to lines terminated with a high characteristic impedance (such as on a transformer, current-limiting reactor, or the like).

Transformers and series reactors exhibit a very high (ideally indefinite) characteristic impedance (sometimes referred to as surge impedance). A line CT measuring current at the terminal measures very small current traveling waves (ideally zero) because the incident and reflected traveling wave cancel at the termination with an infinite characteristic impedance. With very low (ideally zero) current traveling waves at the line end that is terminated on a power transformer, current-based traveling wave functionality at that terminal is not available.

What would be advantageous is a system for protection of power lines using traveling wave principles even when a line is terminated at a high characteristic impedance. Further advantages may be found in a system to determine whether a line is terminated at a sufficiently high characteristic impedance and select among protection elements based on the present termination status.

Presented herein are systems and methods of detecting a fault on a power line terminated at a high characteristic impedance using traveling wave overcurrent principles.

Further presented herein are systems and methods for determining a status of a power line as terminated at a sufficiently high characteristic impedance, and selecting among traveling wave overcurrent protection elements and traveling wave differential elements based on the present status of the termination.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Several aspects of the embodiments described may be implemented as software modules or components or elements. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions. Software modules or components may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment.

FIG. 1 illustrates a one-line diagram of an electric power delivery system 10 wherein a transmission line 114 connects a system terminal S 152 with a transformer terminal T 154. The low-voltage side of the transformer 162 typically feeds loads, which may comprise motors 126 and on-site or distributed generation 124. A load bus 156 can have redundant connections to the system 100, shown as line 164. These connections can be permanent (the load is operated with multiple sources paralleled) or the sources may be switched through a bus transfer scheme. In general, line 114 may be monitored and protected using a system of IEDs that include IED 110 at the S terminal 152 and IED 112 at the T terminal 154.

The IEDs 110, 112 provide electric power system protection such as differential protection, distance protection, overcurrent protection, and the like. Although some elements of IED 110 are shown and described in detail, both of the IEDs 110, 112 may include similar elements. The IED 110 may include a processor 140 for executing computer instructions, which may comprise one or more general purpose processors, special purposes processors, application-specific integrated circuits, programmable logic elements (e.g., FPGAs), or the like. The IED 110 may further comprise non-transitory machine-readable storage media 136, which may include one or more disks, solid-state storage (e.g., Flash memory), optical media, or the like for storing computer instructions, measurements, settings and the like. The IED 110 may be communicatively coupled to the IED 112 either directly or using one or more communication networks via one or more communication interfaces 134. If a communication network is used, it may include special-purpose networks for monitoring and/or controlling the electrical power system 100 (e.g., SCADA networks, or the like), or my even include general purpose communication networks, such as a TCP/IP network, or the like. The communication interface 134 may include wired and/or wireless communication interfaces (e.g., serial ports, RJ-45, IEEE 802.11 wireless network transceivers, etc.). In some embodiments, the IEDs 110, 112 may include human-machine interface (HMI) components (not shown), such as a display, input devices, and so on.

The IEDs 110, 112 may include a plurality of monitoring and protection elements, which may be described as a monitoring and protection module 138 that may be embodied as instructions stored on computer-readable media (such as storage media 136). The instructions, when executed on the processor 140, cause the IED to detect a fault. Upon detecting a fault, the instructions may cause the IED to take actions such as protective actions (signaling a circuit breaker to open the appropriate phases), displaying fault information, sending messages including the fault information, and the like. Methods disclosed herein may generally follow the instructions stored on media for line protection.

The monitoring and protection module 138 may include an overcurrent element, a differential element, a distance element, and the like. The storage media 136 may include protective action instructions to cause the IED 110 to signal a circuit breaker 102 to open via the monitored equipment interface 132, removing electric power from being fed to the fault upon detecting the fault and fault attributes such as a directional overcurrent condition and distance to the fault.

The IED 110 may obtain electrical signals (the stimulus 122) from the power system 100 through instrument transformers (CTs, VTs, or the like). The stimulus 122 may be received directly via the measurement devices described above and/or indirectly via the communication interface 134 (e.g., from another IED or other monitoring device (not shown) in the electrical power system 100). The stimulus 122 may include, but is not limited to: current measurements, voltage measurements, equipment status (breaker open/closed) and the like.

The IED may include a signal processing module 130 to receive the electric power system signals and process the signals for monitoring and protection such as distance protection. Line currents and voltages may be sampled at a rate suitable for protection, such as in the order of kHz to MHz. An analog-to-digital converter (ADC) may create digital representations of the incoming line current and voltage measurements. The output of the ADC may be used in various embodiments herein. As described above, these voltage and/or current signals may be used to detect faults and determine a protective action. Similarly, IED 112 may be configured to effect protective operations by sending signals to circuit breaker 104.

A monitored equipment interface 132 may be in electrical communication with monitored equipment such as circuit breaker 102. Circuit breaker 102 may be configured to selectively trip (open). The monitored equipment interface 132 may include hardware for providing a signal to the circuit breaker 102 to open and/or close in response to a command from the IED 110. For example, upon detection of a fault and determining that the fault is within the zone of protection, the monitoring and protection module 138 may determine a protective action and effect the protective action on the power system by, for example, signaling the monitored equipment interface 132 to provide an open signal to the appropriate circuit breaker 102. Upon detection of the fault and determination that the fault is within the zone of protection, the IED 110 may signal other devices (using, for example, the network, or signaling another device directly by using inputs and outputs) regarding the fault, which other devices may signal a breaker to open, thus effecting the protective action on the electric power delivery system.

IEDs 110, 112 may be configured to detect faults on the electric power delivery system, determine if the fault is within a protected zone, and effect a protective action if the fault is within the protected zone. Accordingly, IEDs 110, 112 may include traveling wave protection elements to determine a fault, determine if the fault is internal to the protected zone, and send a trip signal to one or both circuit breakers 102, 104. IEDs 110 and 112 may be in communication to share traveling wave information and power system status information, and for various other protection schemes. In various embodiments, the IEDs 110, 112 may share information such that each IED may perform traveling wave differential protection.

Figure 2:
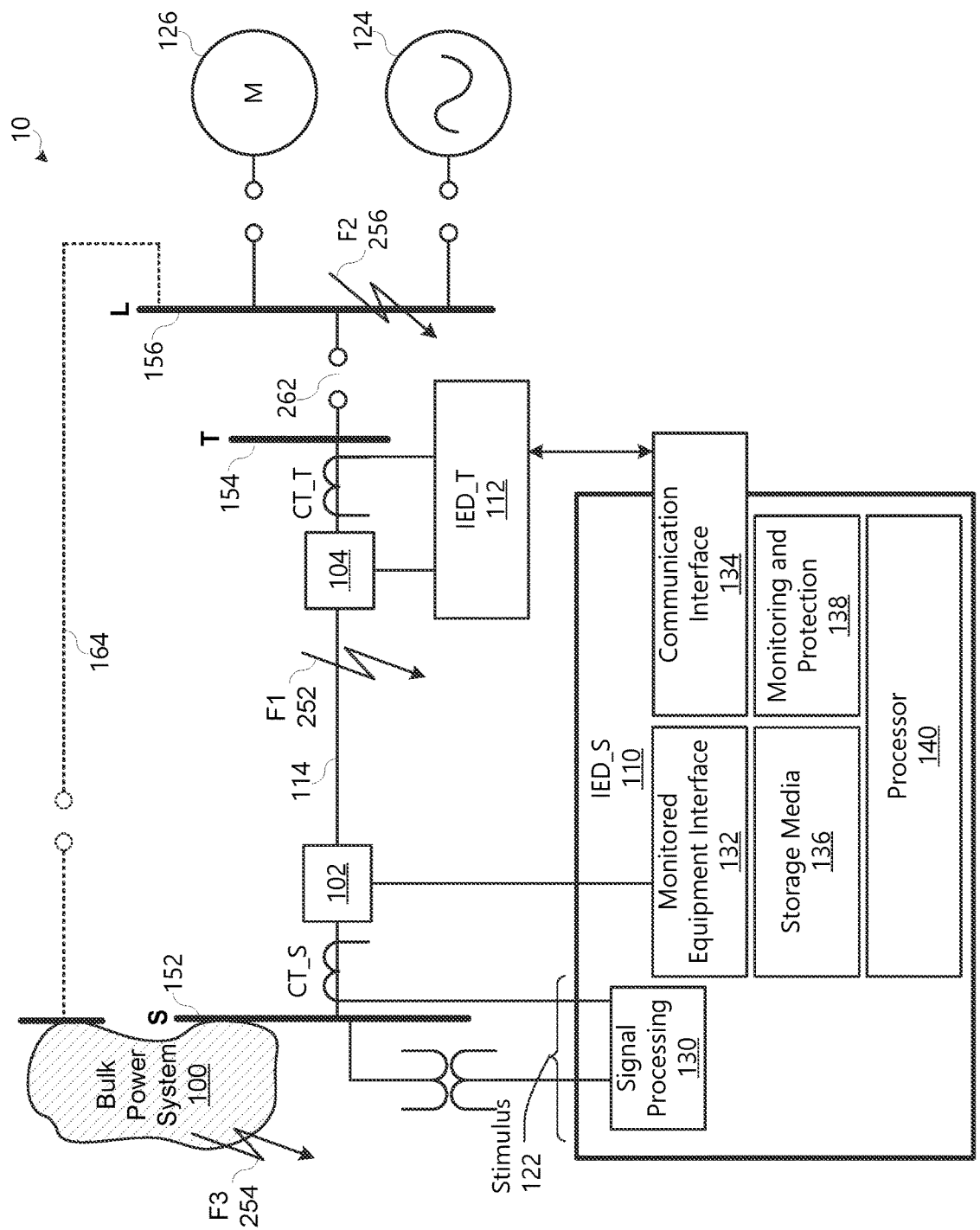
FIG. 2 illustrates a one-line diagram of an electrical power delivery system comprising IEDs implementing traveling wave overcurrent protection in accordance with several embodiments herein.

FIG. 2 illustrates an equivalent network diagram for traveling wave propagation considerations for the system illustrated in FIG. 1. Power system elements that include lumped inductance at their terminals (transformers, motors, generators) are open circuits for current traveling waves.

An internal fault F1 252 on the line 114 launches traveling waves that propagate away from the fault in both directions. The traveling wave that arrives at terminal S 152 reflects off the typically low termination impedance of the system without changing polarity, and the total current traveling wave measured by IED 110 using the CT_S at terminal S 152 is significant.

Figure 3:
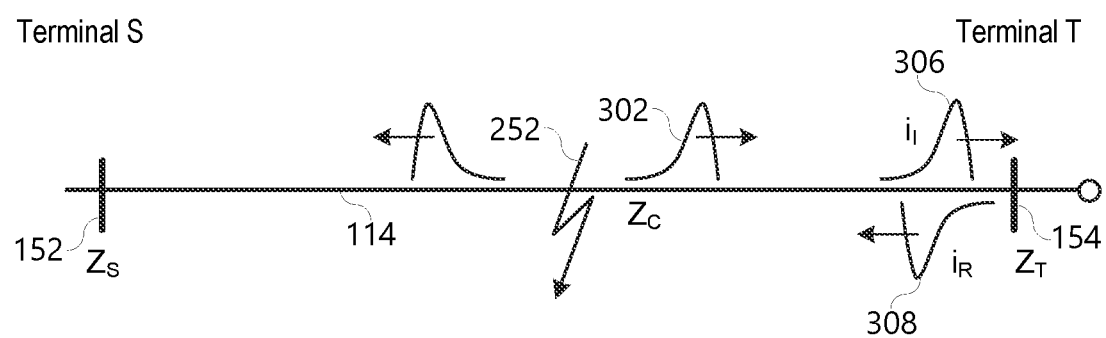
FIG. 3 illustrates traveling waves and reflections resulting from a fault on an electric power system.

As illustrated in FIG. 3, traveling wave 302 is launched toward terminal T 154. The incident traveling wave 306 reflects completely off of the infinite impedance (or high impedance) termination as traveling wave 308 and travels back toward the line 114 with inverted polarity (reflected traveling wave 308=−incident traveling wave 306). As a result, the terminal CT_T measures the total current traveling wave that is substantially zero (reflected traveling wave+ incident traveling wave=0). The absence of a measurable total current traveling wave at terminal T 154 prevents current-only traveling wave based protection and fault locating applications at terminal T 154.

An external fault 256 in the low-voltage system also launches traveling waves in the overhead lines and cables present in the low-voltage system. However, because the transformer 162 is an open circuit 262 for current traveling waves, no traveling waves propagate from the fault 256 to line 114 through terminal T 154. The parallel connections to the system (e.g. 164) must have transformers to match the voltage levels between busses L 156 and S 152. Therefore, traveling waves do not propagate from the fault 256 to the line 114 through terminal S 152 either.

External fault 254 in the high-voltage system also launches traveling waves. These traveling waves propagate throughout the system and enter the line 114. Typically, terminal S 152 has a low termination impedance and only a fraction of the incident traveling wave from the fault 254 propagates into the line 114. A directional element operating in IED 110 may be used to determine that fault 254 is external, and may be used to block protective actions.

As discussed above, for internal faults such as 252 in a system with one end terminated at high characteristic impedance, the current traveling waves from that end are not available for protection or fault locating using traveling wave principles. In such systems, IED 110 may use traveling wave overcurrent fault detection in accordance with the embodiments described herein. The traveling wave overcurrent detection may be performed using a traveling wave overcurrent element operating as part of the monitoring and protection module 138 of IED 110.

Figure 4:
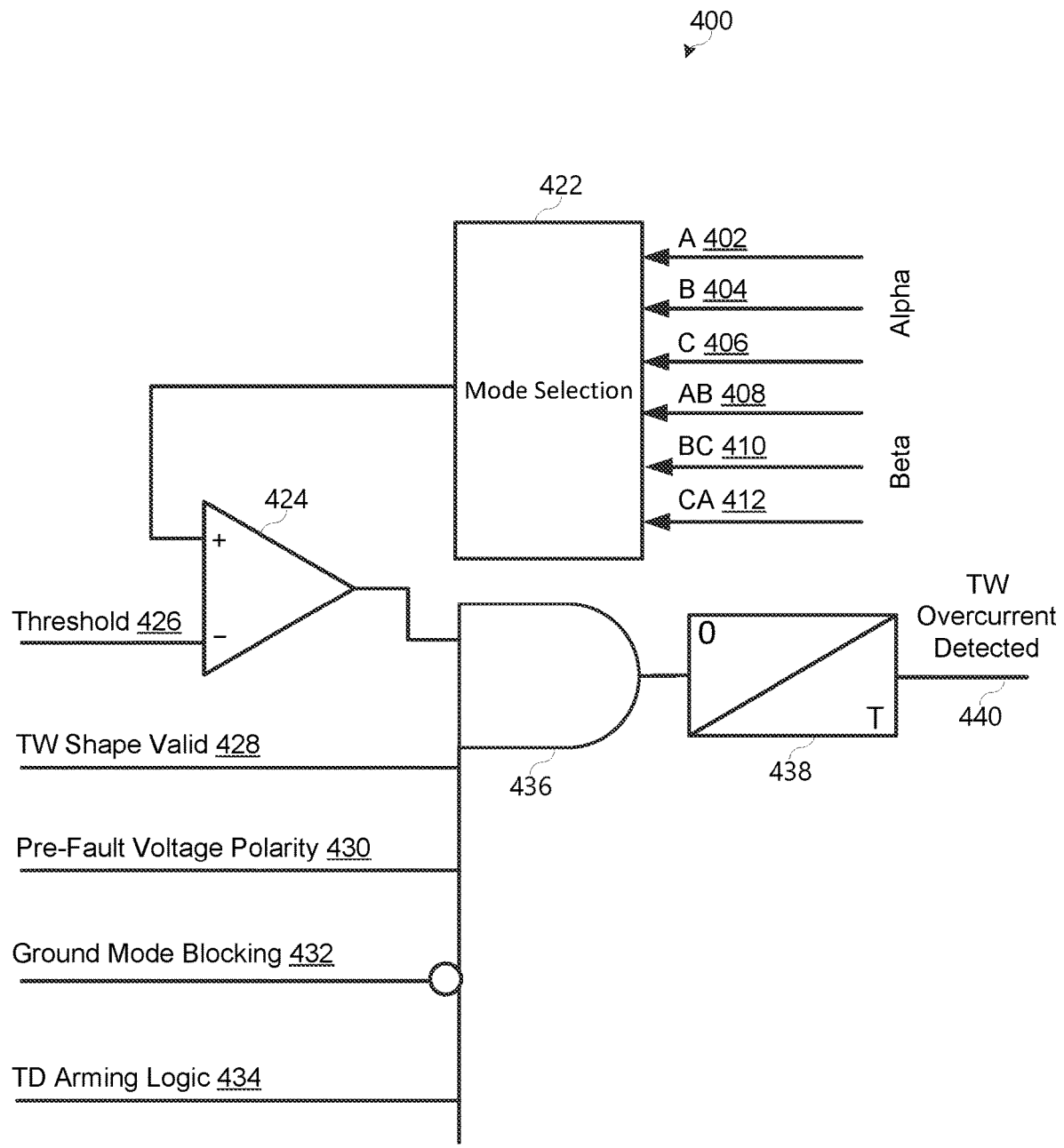
FIG. 4 illustrates a logic diagram for determining a traveling wave overcurrent condition in an electric power delivery system in accordance with several embodiments herein.

FIG. 4 illustrates a simplified logic diagram of a traveling wave overcurrent element 400 in accordance with several embodiments herein. Local current measurements are used to determine a traveling wave overcurrent condition. Remote current measurements are not needed for traveling wave overcurrent fault detection. The six current traveling wave modes that include alpha mode traveling wave currents for phases A 402, B 404, and C 406 as well as beta mode traveling wave currents for phase pairs AB 408, BC 410, and CA 412 are obtained and provided to mode selection 422. The mode selection 422 selects the highest mode among the six traveling-wave current modes for further processing. Because beta modes during phase-to-phase faults are higher by $\sqrt{3}$ than the alpha modes during phase-to-ground faults, the alpha modes may each be multiplied by $\sqrt{3}$ so that the mode selection 422 may directly compare the alpha and beta magnitudes and apply a common pickup threshold 426.

Comparator 424 may be used to compare the maximum mode current TW against a predetermined traveling wave overcurrent pickup threshold 426. The threshold 426 may be calculated and used as a predetermined setting. The threshold 426 may be calculated based on the system nominal voltage and a minimum characteristic impedance. The minimum characteristic impedance may be the lowest characteristic impedance among the lines that can be connected to the low-voltage bus (e.g. bus L 156 in FIG. 1). The threshold 426 may be calculated as a ratio between the nominal line voltage and the minimum characteristic impedance. In various embodiments, the threshold may be calculated as illustrated in Equation 1:

$$\text{Threshold} = 2 * \sqrt{\frac{2}{3}} * \delta * \frac{V_{N(L)}}{Z_{C_{MIN(L)}}} * k \qquad \text{Eq. 1}$$

where:

$\delta$ is a coefficient that models the fraction of the current traveling wave that couples from the low-voltage to the high-voltage system across the power transformer;

$V_{N(L)}$ is the nominal low-voltage system voltage;

$Z_{CMIN(L)}$ is the lowest characteristic impedance among the lines that can be connected to the low-voltage bus; and k is a coefficient to provide a security margin.

If the maximum mode from 422 exceeds the traveling wave overcurrent pickup threshold 426, then comparator 424 asserts an input to AND gate 436. In various embodiments, a traveling wave overcurrent signal 440 may be asserted upon assertion of comparator 424. In some embodiments include further supervision before declaring the traveling wave overcurrent fault detection signal 440 may be asserted. AND gate 436 may ensure that all of the supervision requirements are satisfied before asserting.

A traveling wave shape valid supervision signal 428 may assert when the current traveling wave waveform has a shape that is consistent with a typical fault on a power line. In various embodiments, the traveling wave shape valid supervision signal 428 asserts when the current traveling wave waveform is a step change with the rise time of a few microseconds. Accordingly, if the nature of the transient is inconsistent with a typical fault, the module does not permit the traveling wave overcurrent element to assert signal 440, and the element does not operate.

A pre-fault voltage polarity supervision signal 430 may be asserted when the current traveling wave polarity is consistent with the polarity of the pre-fault voltage. When a fault occurs on a power line and the pre-fault voltage is positive, then the fault lowers the voltage (change in voltage is negative). The negative change in voltage launches a negative current traveling wave, assuming the polarity reference is away from the fault. Because the line protection CTs measure the currents by using the polarity convention that is away from the bus and toward the line, the relay measures the current traveling wave for a forward fault as positive. As a result, forward faults that occur when the pre-fault instantaneous voltage is positive result in positive current traveling waves. Forward faults that occur when the pre-fault instantaneous voltage is negative result in negative current traveling waves. This directional verification brings additional security for reverse faults. The AND gate 436 cannot assert without the pre-fault voltage polarity supervision signal 430.

A ground mode blocking signal 432 may assert to block assertion of the traveling wave overcurrent detection signal 440 during lightning strikes and other non-fault events that may nevertheless launch current traveling waves. A ground mode blocking module may verify that the ground mode is relatively low compared with the highest alpha or beta mode. Lightning strikes and other events may induce small current traveling waves. However, unlike during line faults, these current traveling waves typically have a very high ground mode compared with the aerial modes.

The time domain arming logic 434 supervisory signal may be de-asserted during line energization to prevent misoperation when energizing the line.

Timer 438 may be used to extend the time that the traveling wave overcurrent detection signal 440 is asserted due to the momentary nature of current traveling waves. In various embodiments the timer 438 may pick up upon assertion of AND gate 436 and maintain the signal 440 during the time T. The time T may be several milliseconds. In various embodiments, time T may be 3 ms.

Figure 5A:
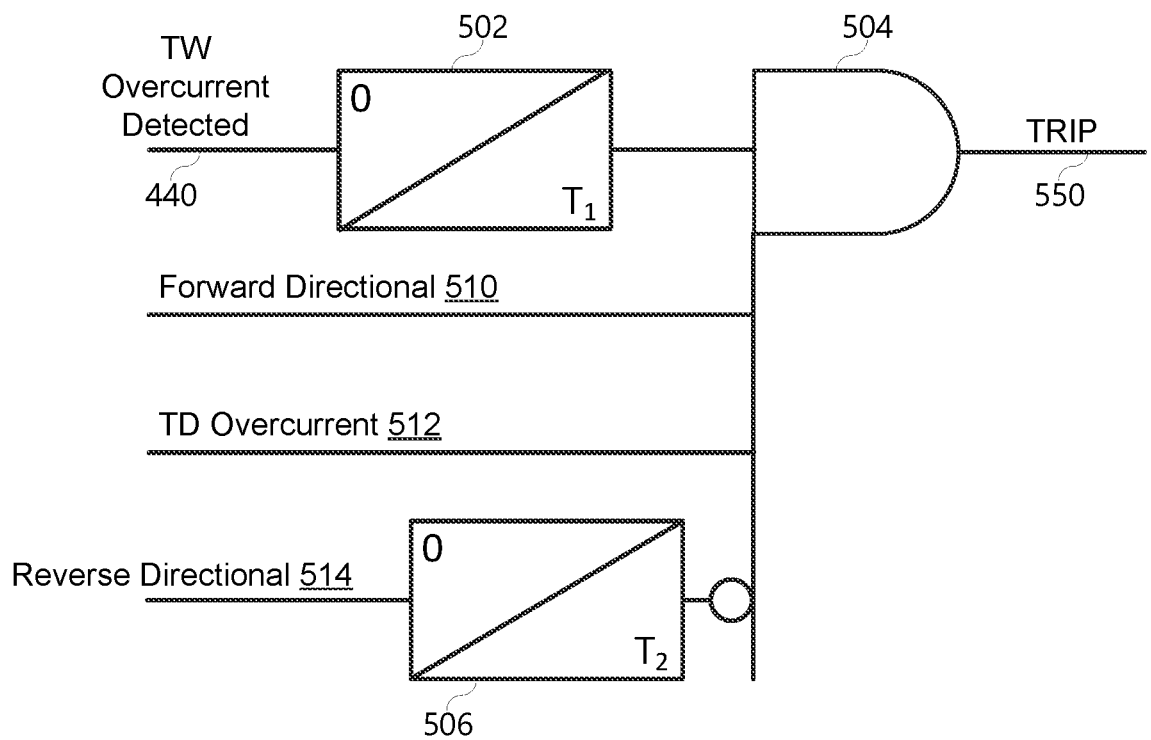
FIGS. 5A, 5B, and 5C illustrate logic diagrams for determining and effecting a protection action using a traveling wave overcurrent indication in accordance with several embodiments herein.
Figure 5B:
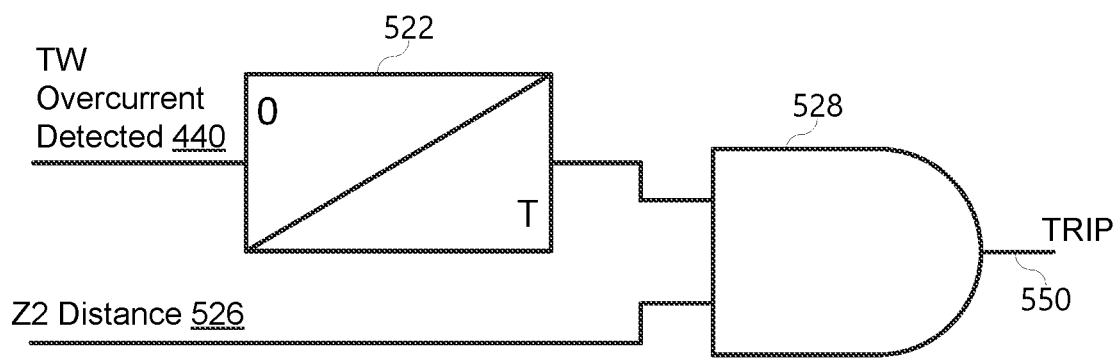
Figure 5C:
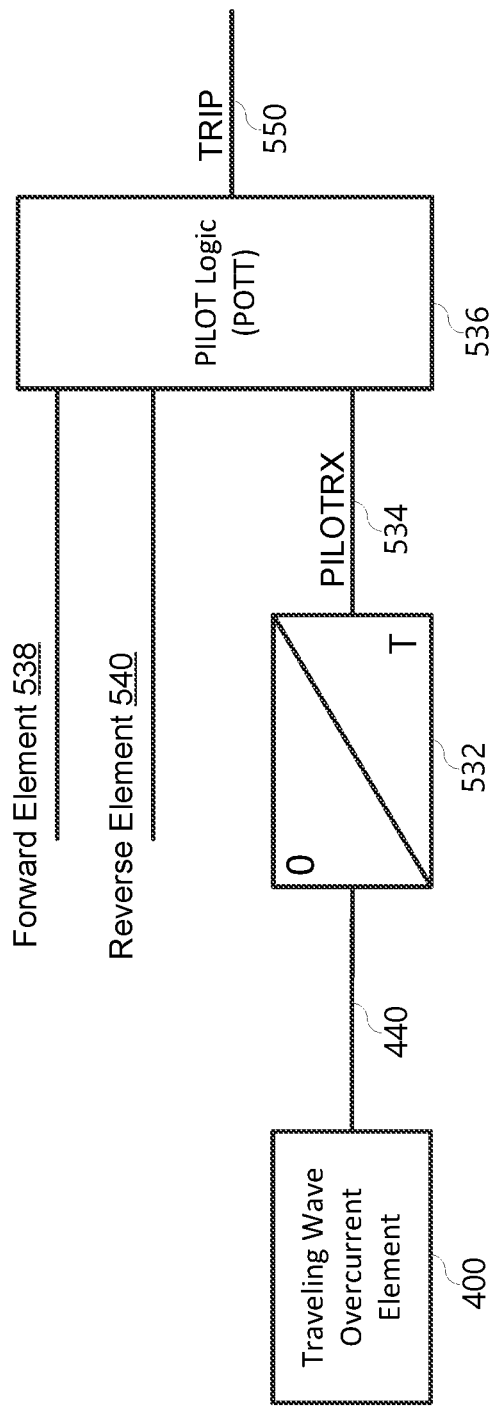

Once the traveling wave overcurrent signal is asserted, the systems herein may use the signal to determine and effect a protective action. FIGS. 5A, 5B and 5C illustrate simplified logic diagrams that may use the traveling wave overcurrent signal 440 to effect a protective action.

In various embodiments, protection operations (e.g. tripping logic) using the traveling wave overcurrent detection signal may use incremental-quantity directional and overcurrent elements. FIG. 5A illustrates a simplified logic diagram of tripping element logic based on incremental quantity elements. In particular, once the traveling wave overcurrent signal 440 is asserted, timer 502 continues to assert the signal to AND gate 504 for a holdover time $T_1$ which may be on the order of around 0.5 power system cycles. AND gate 504 will assert a trip signal 550 if the timer 502 is asserted while the fault condition and direction is verified. The fault condition and direction may be verified using signals from various other elements. For example, a forward direction signal 510 may be provided using a time-domain directional element to determine that the fault is in the line portion 114 of the power system. Further, a reverse directional signal 514 may assert to timer 506 (which may hold over for a time $T_2$ of around 1 power system cycle). During the holdover time $T_2$ of timer 506 upon assertion of the reverse directional signal 514, the AND gate 504 cannot assert the trip signal 550. The reverse directional signal 514 may be generated using traveling wave principles in a traveling wave directional element. Finally, the fault condition may be verified by a time-domain overcurrent signal 512, which may be asserted by a time-domain overcurrent element. Thus, a trip signal 550 is asserted when the traveling wave overcurrent is detected, the forward directional signal 510 is asserted and the time-domain overcurrent signal 512 is asserted while the reverse directional signal 514 is not asserted and has not been asserted in the immediate past.

In accordance with some embodiments, protection operations using the traveling wave overcurrent detection signal herein may use overreaching phase and ground distance elements. FIG. 5B illustrates a simplified logic diagram of tripping element logic based on overreaching phase and ground distance elements. Assertion of the traveling wave overcurrent detection signal 440 causes timer 522 to assert for a holdover time T. AND gate 528 asserts the trip signal 550 upon assertion of the traveling wave overcurrent detection signal and assertion of a signal from an overreaching phase and ground distance element 526. The overreaching phase and ground distance element may be configured for zone 2 protection, and may operate on any of a number of available principles. For example, the element may use a quadrilateral operating characteristic or a mho operating characteristic. Thus a trip signal 550 is asserted when the traveling wave overcurrent is detected and the fault is within the reach settings according to an overreaching phase and ground distance element.

The overreaching phase and ground distance element may be used to confirm the fault direction, intentionally limit the reach, and apply built-in overcurrent supervision. The holdover time T of timer 522 may be on the order of one power system cycle in order to wait for the overreaching phase and ground distance element to assert.

In certain embodiments, the logic illustrated in FIGS. 5A and 5B may be configured to operate on a per-phase basis.

In some embodiments, the traveling wave overcurrent signal 440 may be used in a POTT scheme as illustrated by the simplified logic diagram of FIG. 5C. In general, the illustrated POTT scheme may use the traveling wave overcurrent signal 440 to substitute for a received permissive signal (e.g. PILOTRX). Typical POTT schemes rely on receipt of a permissive trip signal from an IED at the other end of the line (such as IED 112 in the system of FIG. 1). However, if communication is unavailable between the IEDs (e.g. due to channel failure, maintenance or service), then the traveling wave overcurrent signal may be used.

The traveling wave overcurrent element 400 may assert the traveling wave overcurrent detection signal 440 to timer 532, which asserts the substitute PILOTRX signal 534 to the POTT logic 536. A forward element may assert signal 538 and a reverse element may assert signal 540 to be used by the POTT logic 536. The timer 532 may hold over for a time T of around 0.5 to around 2 power system cycles depending on the speed of the forward element. The POTT logic 536 may operate in accordance with a typical POTT principle of operation, and may assert a trip signal 550 upon assertion of the traveling wave overcurrent detection signal, the forward signal and absence of the reverse signal. In various embodiments, upon assertion of the traveling wave overcurrent signal 440 the POTT logic 536 may assert the trip signal 550 as soon as the forward element asserts signal 538 while the reverse signal 540 is not asserted and has not been asserted in the immediate past. The forward element may be a time-domain directional element, which typically asserts in around 1-3 ms. The forward element may be a negative-sequence directional element or a zero-sequence directional element, which may assert in around 0.5 power system cycles. The forward element may be a distance element that may assert in around 1 power system cycle.

Figure 6A:
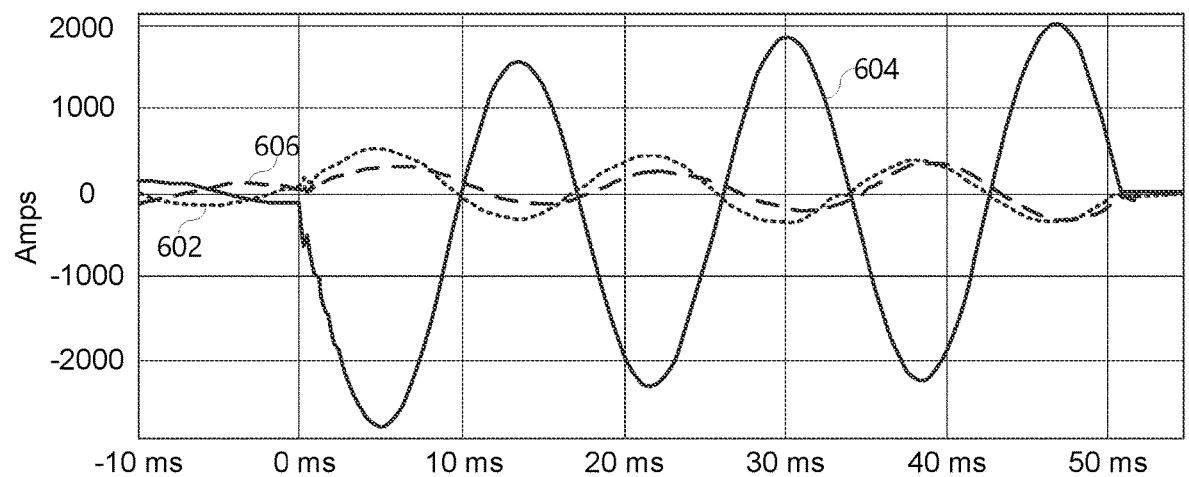
FIGS. 6A and 6B illustrate current waveforms resulting from a fault inside of a protected portion of an electric power delivery system.
Figure 6B:
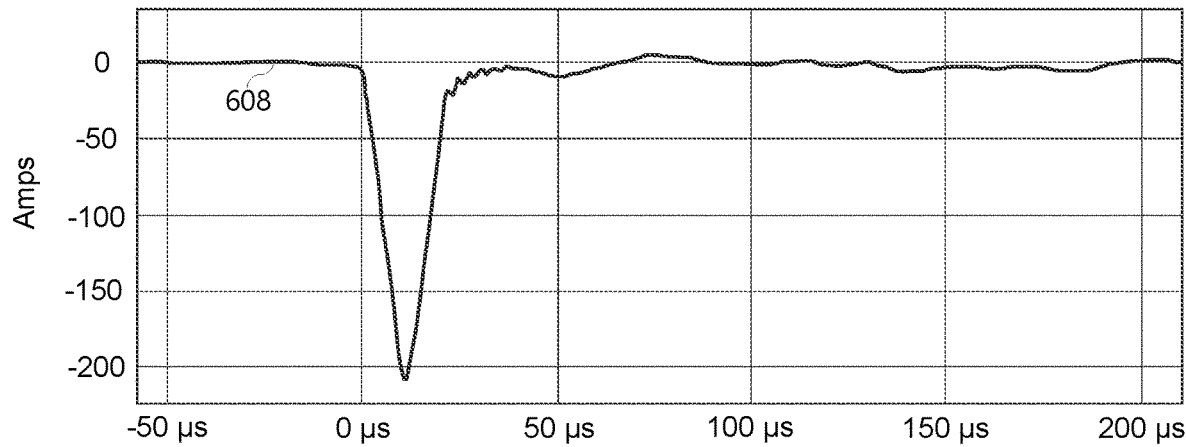

FIGS. 6A and 6B illustrate waveforms for an internal B-phase-to-ground fault (e.g. F1 252) on a power system similar to that depicted in FIGS. 1 and 2. Traces of current waveforms for the A-phase 602, B-phase 604, and C-phase 606 are illustrated in FIG. 6A. The B-phase-to-ground fault occurs at time marked 0 ms. The current traveling wave observed at IED 110 is illustrated by trace 608 in FIG. 6B. The traveling wave can be clearly seen with a magnitude of just over 200 Amps. Using the traveling wave overcurrent element as disclosed herein configured with a pickup setting of around 30 A results in the traveling wave overcurrent fault detection in around 1.5 ms when using protection logic of FIG. 5A. When using protection logic of FIG. 5B, where the ground and distance elements operate in around 8 ms, the trip signal is provided at around 8 ms.

Furthermore, it has been observed that a fault occurring on the low-voltage system, such as fault F2 256 of FIG. 2 results in a very small traveling wave current transmitted to the protected line 114. Indeed, it has been observed in the same power system in which the fault case in FIG. 6 has bene captured that such a B-phase-to-ground fault results in a traveling wave at terminal S obtained using IED 110 with a magnitude of around 18 A primary. With the traveling wave overcurrent threshold set at 30 A, the traveling wave overcurrent element would not pick up, and the logic restrains correctly for this external fault.

In accordance with various embodiments, traveling wave overcurrent protection as described herein may be used in the monitoring and protection modules of multiple IEDs to protect a power line. For example, the monitoring and protection module 138 of IEDs 110 and 112 may include traveling wave overcurrent protection. The monitoring and protection modules 138 may also include other protection elements such as traveling wave differential protection. Because traveling wave differential protection works dependably when both ends of the protected line are terminated on a low surge impedance, the traveling wave overcurrent protection may not be needed or possible in such instances. Accordingly, what would be advantageous are systems and methods to determine when to use traveling wave differential elements for power system protection and when to use traveling wave overcurrent elements for power system protection.

When a line is terminated on a power transformer, an autotransformer, or a current-limiting series reactor, the local current traveling wave is very small due to the high-surge impedance termination. In such installation configurations, the IED at the terminal with the high-surge impedance termination may not detect the incident traveling wave as discussed above. Because the traveling wave differential element requires traveling wave information from both ends, a traveling wave differential element would not detect the fault in such an installation configuration. In such applications, protection using the traveling wave differential element is secure but is not dependable. This loss of dependability may be resolved by also using protection schemes with traveling wave overcurrent elements at the opposite terminal from the terminal with high surge impedance as described herein.

Power system configurations change as assets are taken out of service and put back into service. At any given time, a protected line may be terminated on a low surge impedance (where protection schemes using the traveling wave differential element are beneficial, and the protection schemes using a traveling wave overcurrent element may not be necessary or possible) or the protected line may be terminated on a high surge impedance (where protection schemes using the traveling wave differential element are not dependable, and protection schemes using traveling wave overcurrent elements may be beneficial). In accordance with one embodiment, the connection status (e.g. high surge impedance connection or low surge impedance connected) may be information included in a supervisory control and data acquisition system (SCADA). The IEDs 110, 112 may use the connection status information available from SCADA to enable and disable the traveling wave overcurrent elements as necessary.

That is, each of IEDs 110, 112 may be in communication with SCADA. IEDs 110, 112 may monitor the connection status information at terminal T 154. If the transformer 162 is connected to terminal T 154 (high surge impedance connection), then IEDs 110, 112 may enable protection using traveling wave overcurrent elements. Similarly, if the connection status in SCADA indicates a low surge impedance connection at terminals T 154 and S 152, then IEDs may disable protection using traveling wave overcurrent elements.

In such embodiments, SCADA may be configured to update its termination connection information based on the actual termination connection. In certain embodiments, SCADA may be configured to transmit a configuration change communication to the IEDs 110, 112 in advance of switching between high and low termination equipment to avoid a race condition caused by traveling waves that may be launched by the switching event itself.

To avoid any reconfiguration of SCADA and related communication requirements, certain embodiments herein may enable the IEDs themselves to determine a connection status during faults, and enable or disable protection based on traveling wave overcurrent elements based on a determined connection status.

Figure 7:
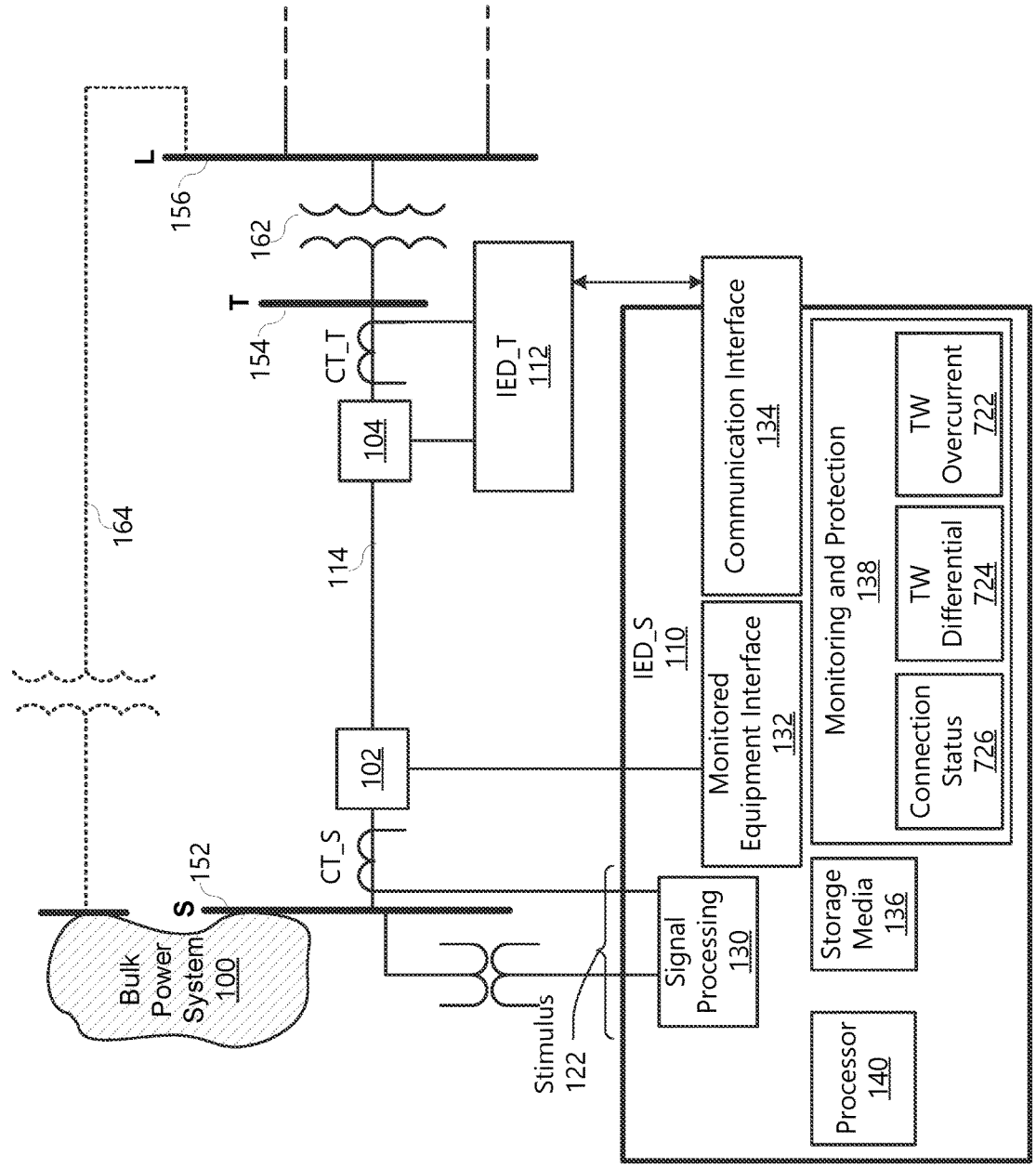
FIG. 7 illustrates a one-line diagram of an electrical power delivery system comprising IEDs implementing traveling wave protection and determining a status of the power system for application of traveling wave overcurrent protection or traveling wave differential protection in accordance with several embodiments herein.

FIG. 7 illustrates a simplified one-line diagram of a power system similar to that of FIGS. 1 and 2, along with a system of IEDs for monitoring and protecting the power system. The IED 110 may include a monitoring and protection module 138 that includes a module for traveling wave differential protection 724 using a traveling wave differential element. The monitoring and protection module may also include a module for traveling wave overcurrent protection 722 using a traveling wave overcurrent element as described herein. As indicated above, each of IEDs 110 and 112 may include these modules. Additionally, the IEDs 110, 112 may include a connection status module 726 to determine a connection status and enable and/disable the traveling wave overcurrent protection 722.

If an external fault (e.g. F2 256) behind the remote terminal T 154 is assumed, and terminal T 154 has a low surge impedance, then a portion of the traveling wave launched by the external fault propagates through terminal T 154. The terminal T current data shows this traveling wave precisely one traveling wave line propagation time (TWLPT) ahead of the arrival of the first traveling wave at the local terminal S 152. If terminal T 154 has a high surge impedance, no significant traveling wave propagates through terminal T 154 and the remote terminal T data does not show any traveling waves.

Similarly, if an internal fault (F1 252) on the protected line 114 is assumed, and terminal T 154 has a low surge impedance, a traveling wave launched by the internal fault 252 arrives at terminal T 154 and is visible in the terminal T currents. The terminal T current data show this traveling wave either behind or ahead of the traveling wave arriving at the local terminal S 152. The time difference between the first traveling waves at terminals T 154 and S 152 is not more than TWLPT. However, if terminal T 154 has a high surge impedance, no significant traveling wave is measured in the terminal T currents for an internal fault.

The connection status module 726 may use high-fidelity current measurements from each end of the line 114. Such measurements are available for the traveling wave differential element. The connection status module 726 may determine 1) arrival of a traveling wave at the local terminal; 2) traveling wave direction at arrival at the local terminal; and 3) time of arrival (if any) of a traveling wave at the remote terminal (using traveling wave information from the remote IED). From this information, the connection status module 726 may determine the connection status of the remote terminal during a fault. Each IED 110, 112 may be configured to determine connection status at the opposite terminal.

The connection status module 726 may use traveling wave information to determine a connection status. If the first current traveling wave at the local terminal S 152 arrives from the direction of the line 114 and at least one current traveling wave is detected at the remote terminal 154 from current measurements obtained at the remote terminal 154 within the time interval of the TWLPT respective to the time of arrival of the current traveling wave at the local terminal S 152, then the remote terminal T 154 has a low surge impedance connection.

If the first current traveling wave at the local terminal S 152 arrives from the direction of the line and no current traveling wave is detected at the remote terminal 154 from current measurements obtained at the remote terminal 154 within the time interval of the TWLPT respective to the time of arrival of the current traveling wave at the local terminal S 152, then the remote terminal T 154 has a high surge impedance connection.

If the connection status module 726 determines a low surge impedance connection at the remote terminal, then protection using traveling wave overcurrent elements 722 is disabled.

However, if the connection status module 726 determines a high surge impedance connection at the remote terminal, then protection using traveling wave overcurrent elements 724 is enabled.

The TWLPT is the time it takes for a traveling wave to travel from one terminal to the other terminal. TWLPT is an IED setting determined at setting time. TWLPT may be measured from an event. TWLPT may be calculated using the line length and a traveling wave velocity for the line.

Traveling wave direction at the local terminal S 152 may be detected using pre-fault voltage, a traveling wave directional element, a time-domain directional element, a phase or ground directional element, a zero-sequence directional element, or a negative-sequence directional element.

Detection of no traveling wave at the remote terminal can be determined using current data from the remote terminal. In various implementations, a differentiator-smoother may be used to determine a current traveling wave from current measurements at the remote terminal as illustrated in FIG. 6B. The data from the differentiator-smoother for the time period of expected current traveling waves may be used. For example, the data from the differentiator-smoother for the time period of one TWLPT before the time of arrival of the current traveling wave at the local terminal S until one TWLPT after the time of arrival of the current traveling wave at the local terminal S may be used. In certain embodiments, an extra margin of data at either end of the data may also be used. The margin may be around 10 µs. The maximum value from the differentiator-smoother during this time period may be obtained. If the maximum value is below a certain fraction (such as 0.1) of the magnitude of the current traveling wave at the local terminal S, then no current traveling wave at the remote terminal T is found.

Figure 8:
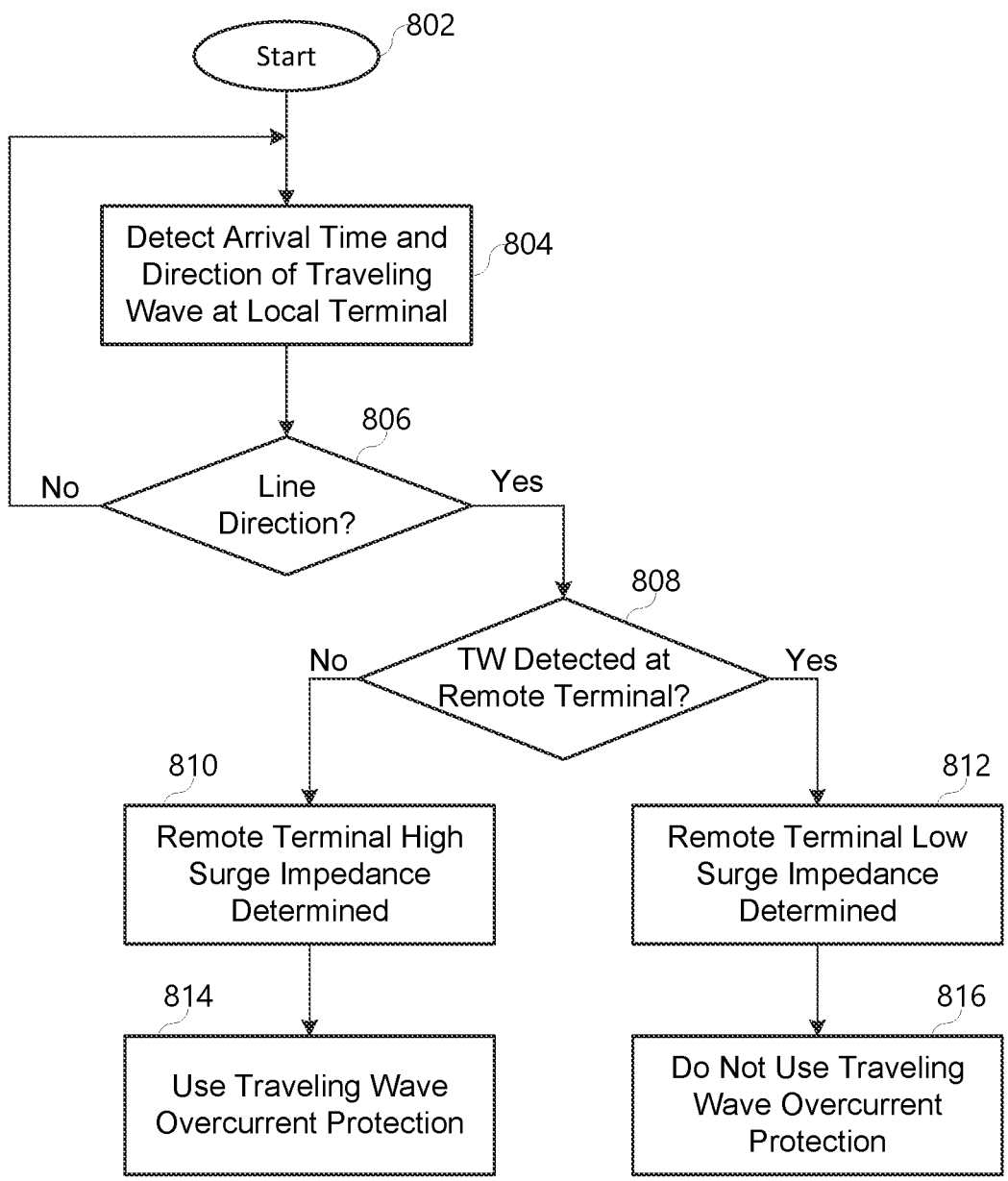
FIG. 8 illustrates a simplified flow diagram of a method for determining a status of a power system for application of traveling wave overcurrent protection or traveling wave differential protection in accordance with several embodiments herein.

FIG. 8 illustrates a simplified flow diagram of a method for determining a connection status in accordance with several embodiments herein. The method starts with detection of the arrival time and direction of a traveling wave at the local terminal 804. If the traveling wave does not arrive from the direction of the protected line, then the method does not proceed to determine the connection status at the remote terminal. However, if the traveling wave does arrive from the direction of the protected line in 806, then the method proceeds to determine if a traveling wave is detected at the remote terminal 808. If a traveling wave is not detected at the remote terminal, then the method determines a high surge impedance connection status at the remote terminal 810. This connection status may be used to modify protection elements including, for example, enabling traveling wave overcurrent protection 814. Various other protection elements may also be modified upon determination of a high surge impedance at a remote terminal as described below.

If, however a traveling wave is detected from the remote terminal 808, then the method may determine a low surge impedance connection status at the remote terminal 812. This connection status may be used to modify protection elements including, for example disabling traveling wave overcurrent protection 816.

The method illustrated in FIG. 8 may be performed each time a disturbance is detected. Accordingly, the termination configuration may be performed dynamically. In various embodiments, a connection status provided by SCADA may be modified using a connection status determined using the method of FIG. 8.

Systems and methods using a connection status module as described herein may not be limited to an actual connection status from SCADA, but instead operate on electrical characteristics of the system. Accordingly, the embodiments herein will detect high surge impedance when the line end is open regardless of the actual surge impedance of the remote bus behind the open breaker or disconnect switch.

In accordance with certain embodiments, further security considerations may be made. For example, closing a circuit breaker may launch current traveling waves that may be mistaken for a line fault and lead to undesired operation. To prevent this, the embodiments herein may use an arming logic that requires both the local and the remote breakers to be closed.

Similarly, switching in-line series capacitors may launch current traveling waves that may be mistaken for line faults and lead to undesired operations. Accordingly, embodiments herein may restrain protection using traveling wave overcurrent elements for series-compensated lines.

Furthermore, various other protection elements may benefit from the line termination connection status provided by the connection status module 726 described herein. For example, certain single-ended traveling wave fault locating logic employed at the local terminal S 152 may be reconfigured to expect high amplitude reflections with opposite polarity arriving from the remote terminal T 154. This modification allows the single-ended traveling wave methods to more accurately determine the fault location. That is, the single-ended traveling wave fault locating methods may not discard certain traveling wave reflections based on polarity, but instead may use these reflections in its calculations of fault location.

In addition, double-ended traveling wave fault locating logic may be reconfigured to use remote terminal T 154 voltage traveling wave information instead of current traveling wave information when the remote terminal has a high surge impedance termination. This substitution allows for the double-ended traveling wave fault locating to operate even when the current traveling wave at the remote terminal T 154 is unavailable.

Finally, upon detection of high surge impedance at the remote terminal T 154, the overcurrent and distance protection elements can be dynamically configured. For example, the reach setting may be increased knowing a transformer, autotransformer or current limiting reactor provides additional impedance between the protected line 114 and the load bus 156. This may provide faster and more dependable protection without loss in selectivity.

While specific embodiments and applications of the disclosure have been illustrated and described, it is to be understood that the disclosure is not limited to the precise configurations and components disclosed herein. Moreover, principles described herein may also be utilized for distance protection and directional overcurrent protection. Accordingly, many changes may be made to the details of the above-described embodiments without departing from the underlying principles of this disclosure. The scope of the present invention should, therefore, be determined only by the following claims.

What is claimed is:

1. A protection system for an electric power delivery system, comprising:
   a data acquisition subsystem in electrical communication with the electric power delivery system, configured to acquire a plurality of power system traveling wave current quantities at a first location of the electric power delivery system;
   a traveling wave overcurrent subsystem configured to:
      determine a maximum traveling wave current quantity of the plurality of power system traveling wave current quantities;
      compare the maximum traveling wave current quantity with a predetermined traveling wave overcurrent threshold;
      receive a security measure indication; and
      when the maximum traveling wave current quantity exceeds the predetermined traveling wave overcurrent threshold and the received security measure indication permits traveling wave overcurrent fault detection, assert a traveling wave overcurrent signal;
   a protection module in communication with the traveling wave overcurrent subsystem, configured to:
      receive the traveling wave overcurrent signal;
      determine a protection action using the traveling wave overcurrent signal; and
      effect the determined protective action on the electric power delivery system.

2. The system of claim 1, wherein the plurality of power system traveling wave current quantities comprise alpha current quantities and beta current quantities.

3. The system of claim 2, wherein the alpha current quantities are scaled by $\sqrt{3}$.

4. The system of claim 1, wherein the security measure indication comprises at least one of: a traveling wave shape validity indication; a pre-fault voltage polarity validity indication; a ground mode rejection indication; an arming logic supervision indication; and combinations thereof.

5. The system of claim 1 wherein the predetermined traveling wave overcurrent threshold comprises a function of a ratio of: a nominal voltage of the electric power delivery system to a characteristic impedance of the electric power delivery system.

6. The system of claim 1, wherein the traveling wave overcurrent subsystem is enabled upon receipt of an indication of a high surge impedance condition at a second location of the electric power delivery system.

7. The system of claim 6, wherein the indication of high surge impedance is received from a supervisory control and data acquisition system.

8. The system of claim 1, further comprising a communication interface for receiving traveling wave current quantities from a second portion of the electric power delivery system remote from the first portion;
   and wherein the protection system is configured to determine a status of the second portion of the electric power delivery system using the received traveling wave current quantities from the second portion and the traveling wave current quantities from the first portion.

9. The system of claim 8, wherein the status comprises one of a low surge impedance termination and a high surge impedance termination.

10. The system of claim 9, wherein the traveling wave overcurrent subsystem is enabled when the status comprises a high surge impedance termination.

11. A method of protecting an electric power delivery system using traveling wave current measurements at a first location of the electric power delivery system, comprising:
   an intelligent electronic device acquiring a plurality of power system traveling wave current quantities at the first location of the electric power delivery system;
   determining a maximum traveling wave current quantity of the plurality of power system traveling wave current quantities;
   comparing the maximum traveling wave current quantity with a predetermined traveling wave overcurrent threshold;
   receiving a security measure indication;
   when the maximum traveling wave current quantity exceeds the predetermined traveling wave overcurrent threshold and the received security measure indication permits traveling wave overcurrent fault detection, asserting a traveling wave overcurrent signal;
   determining a protection action using the traveling wave overcurrent signal; and,
   effecting the determined protective action on the electric power delivery system.

12. The method of claim 11, wherein the plurality of power system traveling wave current quantities comprise alpha current quantities and beta current quantities.

13. The method of claim 12, wherein the alpha current quantities are scaled by $\sqrt{3}$.

14. The method of claim 11, wherein the security measure indication comprises at least one of: a traveling wave shape validity indication; a pre-fault voltage polarity validity indication; a ground mode rejection indication; an arming logic supervision indication; and combinations thereof.

15. The method of claim 11 wherein the predetermined traveling wave overcurrent threshold comprises a function of a ratio of: a nominal voltage of the electric power delivery system to a characteristic impedance of the electric power delivery system.

16. The method of claim 11, further comprising receiving an indication of high surge impedance at a second location of the electric power delivery system.

17. The method of claim 16, wherein the indication of high surge impedance is received from a supervisory control and data acquisition system.

18. The method of claim 11, further comprising:
receiving traveling wave current quantities from a second portion of the electric power delivery system remote from the first portion;
determining a status of the second portion of the electric power delivery system using the received traveling wave current quantities from the second portion and the traveling wave current quantities from the first portion.

19. The method of claim 18, wherein the status comprises one of a low surge impedance termination and a high surge impedance termination.

20. The method of claim 19, further comprising enabling traveling wave overcurrent protection when the status comprises a high surge impedance termination.

21. A system for protection of electric power delivery systems comprising:
a data acquisition subsystem in electrical communication with a local terminal of the electric power delivery system, configured to acquire a plurality of local terminal traveling wave current quantities;
a communication interface for receiving a plurality of remote traveling wave current quantities from a remote terminal of the electric power delivery system;
a protection module for determining a protective action using one of a traveling wave differential element and a traveling wave overcurrent element and effecting the determined protective action; and
a connection status module to determine a termination status of the remote terminal using the plurality of local traveling wave current quantities and the plurality of remote terminal current traveling wave quantities;
wherein the protection module is configured to enable the traveling wave overcurrent element when the connection status determines the termination status of the remote terminal as a high surge impedance termination.

22. A method for determining a status of a remote terminal of an electric power delivery system, the method comprising:
obtaining local terminal current quantities;
receiving remote terminal current quantities;
detecting a local terminal traveling wave arrival time using the local terminal current quantities;
determining a direction of the traveling wave arrival at a local terminal using the local terminal current quantities;
determining detection of a traveling wave at the remote terminal using the remote terminal current quantities;
determining the status of the remote terminal as high surge impedance when the direction of the traveling wave is from a line and no traveling wave is detected at the remote terminal;
determining the status of the remote terminal as low surge impedance when the direction of the traveling wave is from the line and a traveling wave is detected at the remote terminal within a predetermined time difference respective to the traveling wave arrival at the local terminal; and
configuring a protection element of a device for protecting the electric power delivery system using the determined status of the remote terminal.

* * * * *